INVENTORS
ROBERT O. BARRY &
JOHN F. WATSON
BY
ATTORNEYS

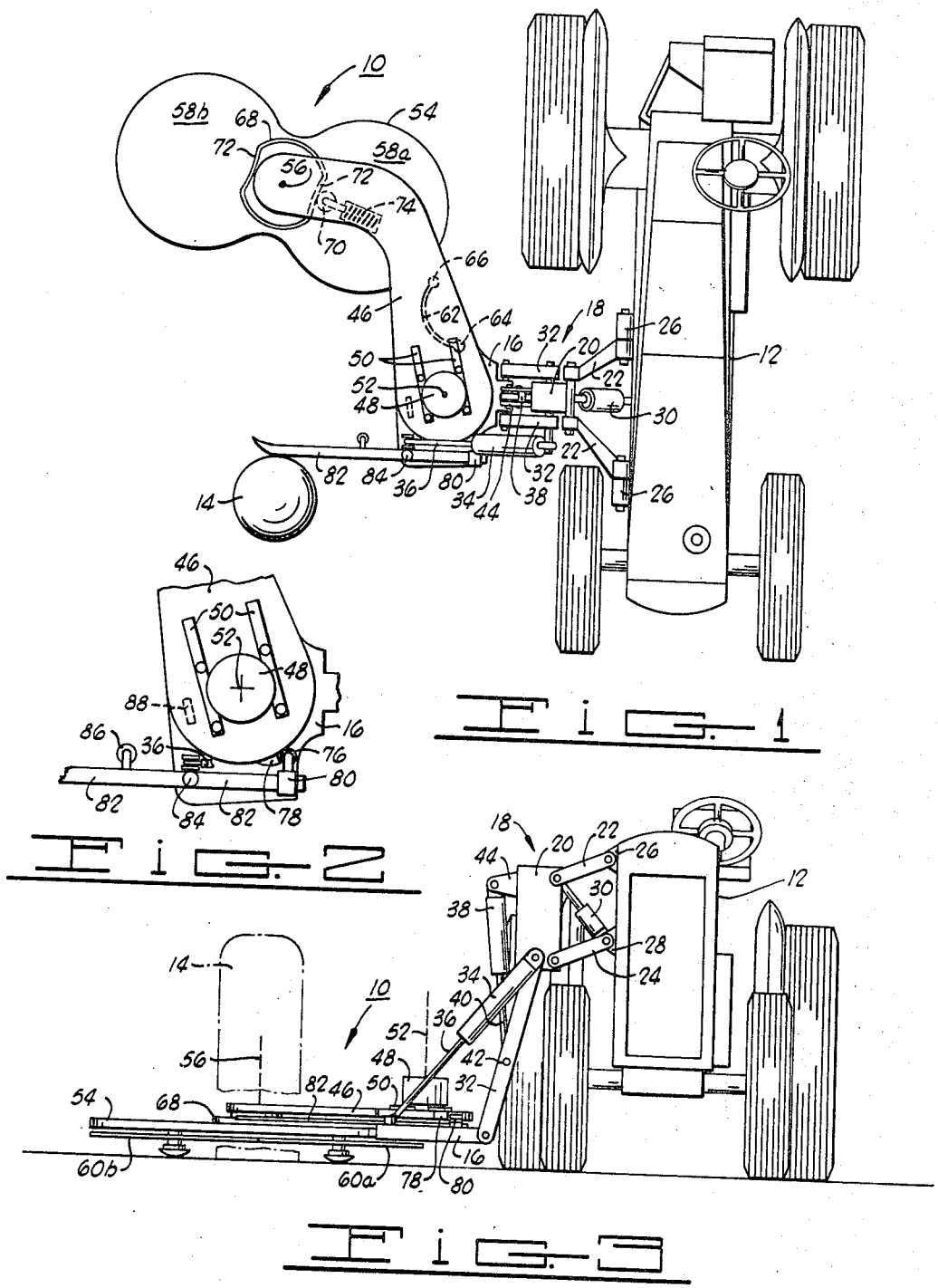

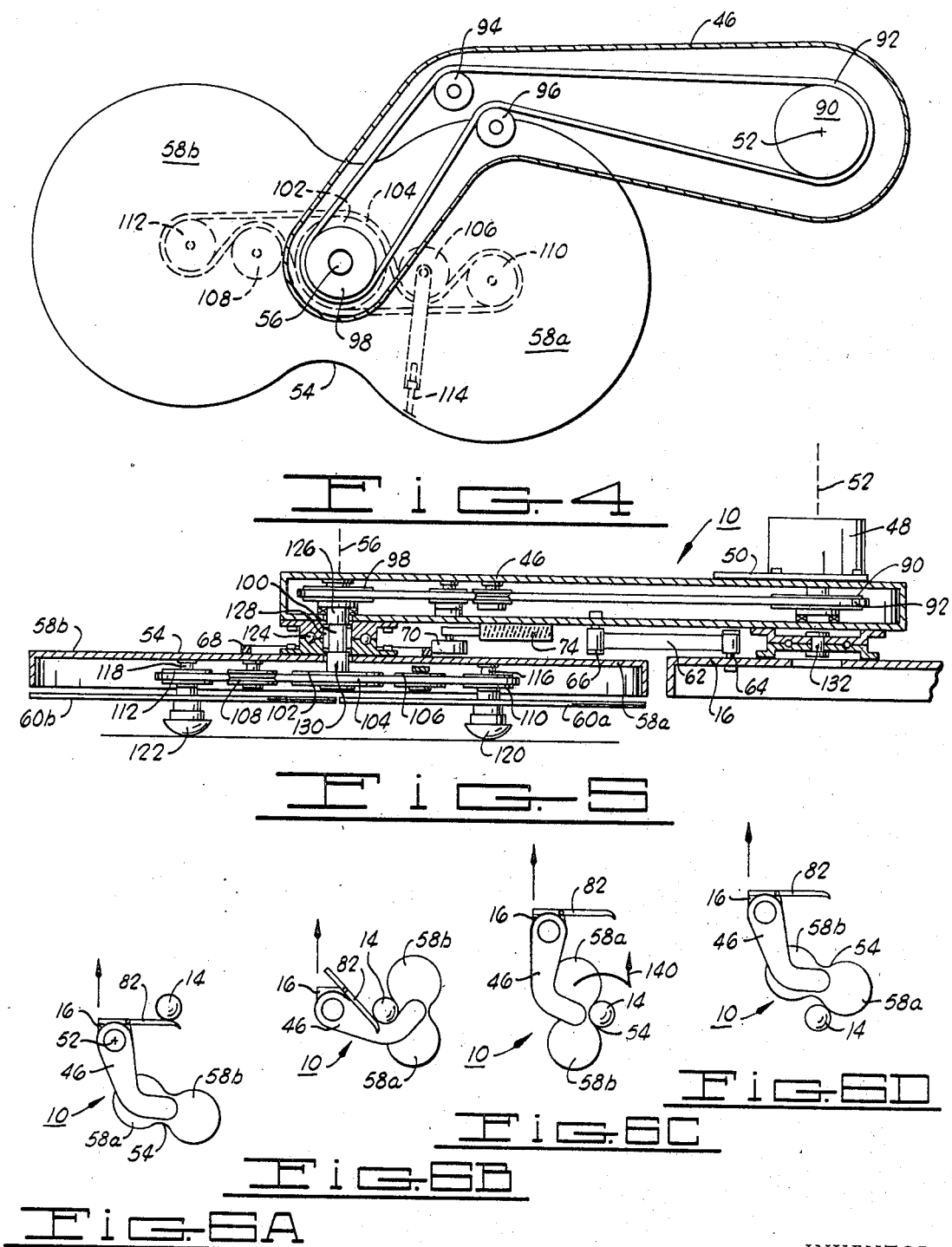

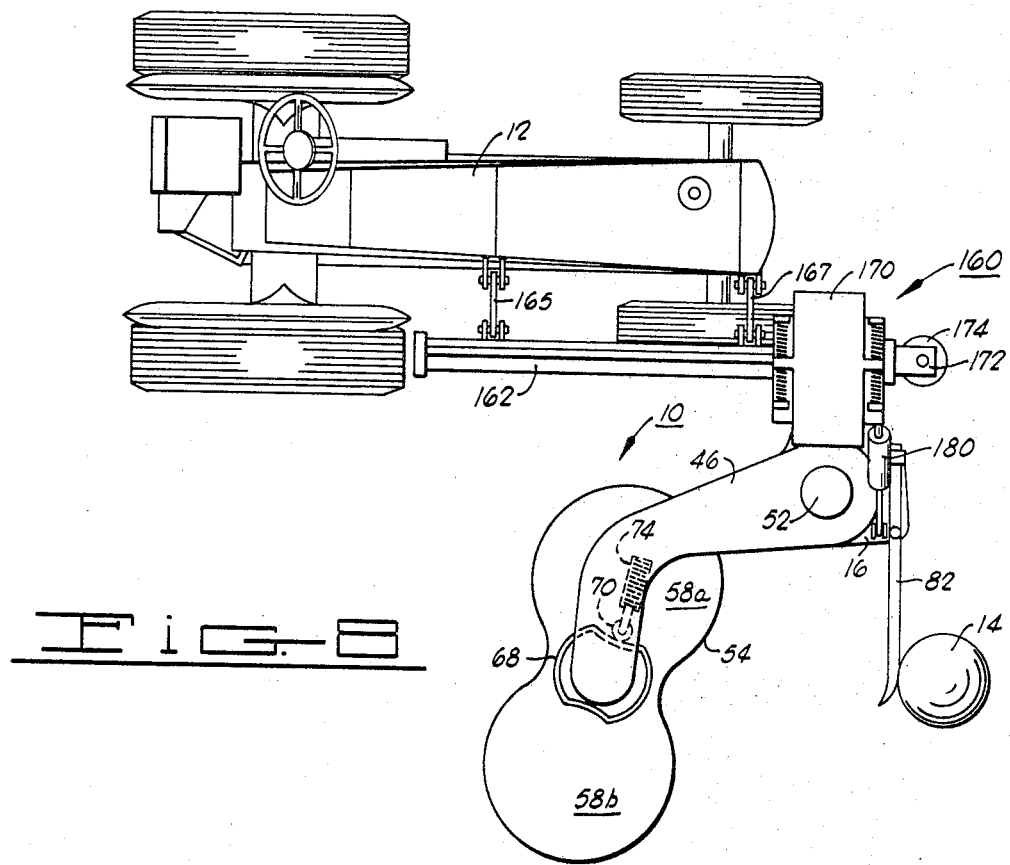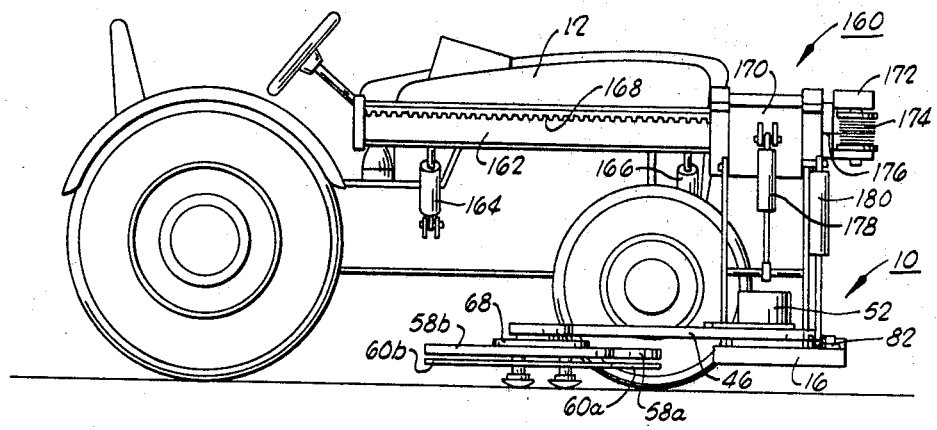

Sept. 1, 1970 R. O. BARRY ET AL 3,526,083
POST MOWER
Filed Dec. 19, 1967 5 Sheets-Sheet 5
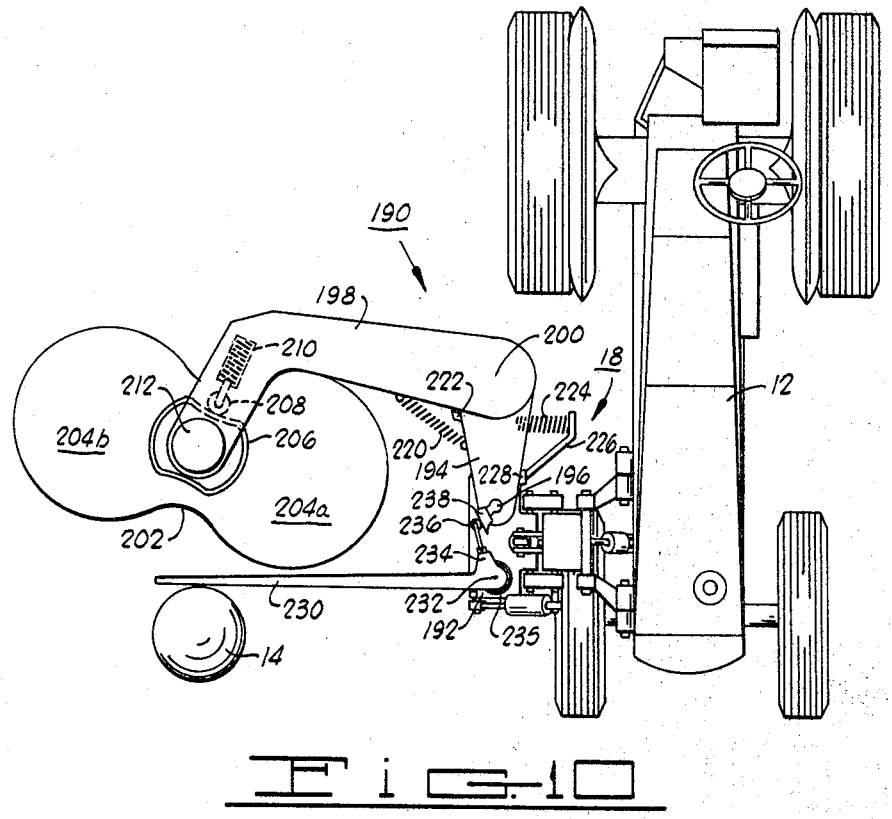
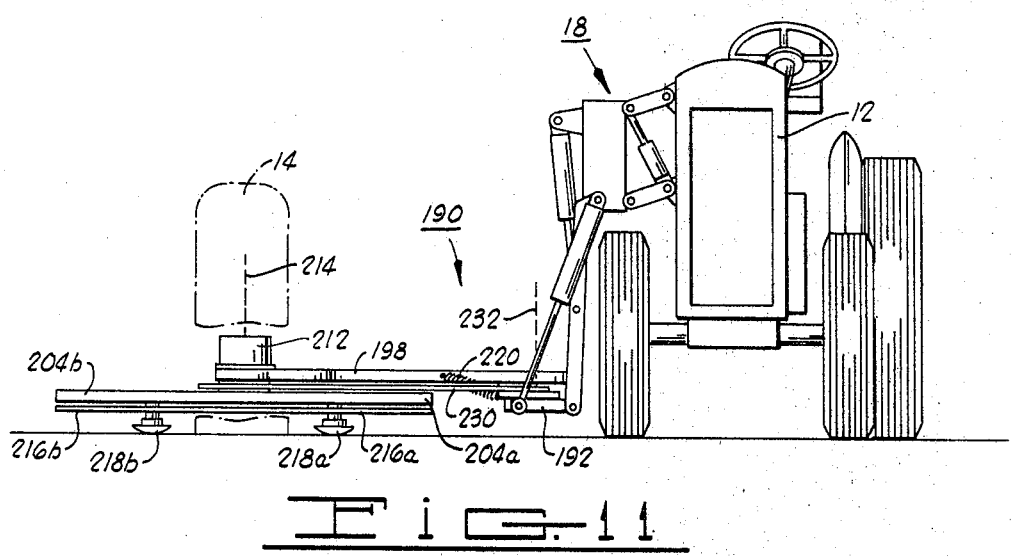
INVENTORS
ROBERT O. BARRY &
JOHN F. WATSON
BY
ATTORNEYS

United States Patent Office 3,526,083
Patented Sept. 1, 1970

3,526,083
POST MOWER
Robert O. Barry, 3621 NW. 65th Terrace 73116, and
John F. Watson, 716 NW. 15th St. 73103, both of
Oklahoma City, Okla.
Filed Dec. 19, 1967, Ser. No. 691,907
Int. Cl. A01d *35/26*
U.S. Cl. 56—25.4     11 Claims

ABSTRACT OF THE DISCLOSURE

Apparatus for mowing around posts, pipes, or whatever, the apparatus being borne by a motive device to mow completely around the object during a single pass by the motive device. The apparatus relies upon a figure-eight cutting head, a pair of rotating mowers in side-by-side array, which is pivotally supported by a central axis from a support arm extending outward from the motive device. Means are provided to sense or respond to the post object to set the support arm and cutter head in motion such that they seek an optimum position from which the forward motion of the motor device causes proper circulation of the cutting head about each successive post object.

BACKGROUND OF THE INVENTION

Field of the invention

The invention relates generally to mobile post mowers and, more particularly, but not by way of limitation, it relates to improved post mowers which perform a complete cutting operation upon a single linear pass of a tractor or such motive support device.

Description of the prior art

The prior art includes various types of mowing implements which are intended for mowing around posts, along fence rows, etc. One type of such mower which is especially intended for fence row mowing from a tractor mount relies upon apparatus which extends upward and over the fence row or series of posts to extend a cutting implement down on each side of the row. Still another and a larger class of such post mowers explore the general concept of a tractor mounted mower carried past a fence or post row, and these devices utilize various designs in an attempt to insure close mowing in and around each post object. It is usually the case that the prior types of devices require that the tractor or support vehicle make a pass on each side of the fence or post row in order to mow completely along the row.

SUMMARY OF THE INVENTION

The present invention contemplates a machine mounted post mower consisting of a horizontally pivotal support arm which supports a figure-eight, double blade cutter head in still further horizontally pivotal manner into engagement around a post. In a more limited aspect, the invention consists of a support assembly which is affixed to a tractor or such motive device and which carries the movable mower elements thereon. A support arm of optimal, curved shape is mounted on the support assembly for rotational, spring-urged movement, and the remaining or outboard end of the support arm carries the cutter head rotationally thereon. The cutter head consists of a pair of side-by-side mower blades within a figure-eight housing and means are provided for controlling rotation and attitude of the cutter head with respect to the support arm. Further means may also be provided for sensing or reacting to a post to initiate predetermined active movement of the support arm and cutting head prior to its passive operation as enabled by forward movement of the motive device.

Therefore, it is an object of the present invention to provide a post mower which performs the cutting operation completely around a post or series of posts during a single pass of the tractor or motive device.

It is also an object of the invention to provide a post mower with a cutter head assembly which is capable of performing the complete mowing operation during a single pass by a post which may be of any diameter not exceeding dimensions for the general class of posts, poles, etc.

It is still a further object of the present invention to provide a post mower which performs the post mowing operation with greater reliability and at an increased speed.

Finally, it is an object of the present invention to provide a post mower mechanism of improved, low-profile design and increased structural reliability which is capable of performing any and all of the roadside mowing operations.

Other objects and advantages of the invention will be evident from the following detailed description when read in conjunction with the accompanying drawings which illustrate the invention.

BRIEF DESCRIPTION OF THE DRAWINGS

FIG. 1 is a top view of one form of the mower device as mounted on a tractor;

FIG. 2 is an enlarged top view of a section of the FIG. 1 mower device;

FIG. 3 is a front view of the mower device and tractor as shown in FIG. 1;

FIG. 4 is an enlarged plan view of the support arm and cutting assembly with the arm broken away and shown in section;

FIG. 5 is in elevation as viewed generally from the front with portions shown in cutaway of the FIG. 1 mower device;

FIGS. 6A, 6B, 6C and 6D depict a series of successive operating attitudes of the FIG. 1 mower device;

FIG. 8 is a top view of the FIG. 1 mower device as it may be supported from a linear rack device supported from a tractor;

FIG. 9 is a side view of the mower mounting structure of FIG. 8;

FIG. 10 is a top view of an alternative form of mower device as supported from a tractor;

FIG. 11 is a front view of the mower device shown in FIG. 10; and

DESCRIPTION OF A FIRST EMBODIMENT

Figure 7:
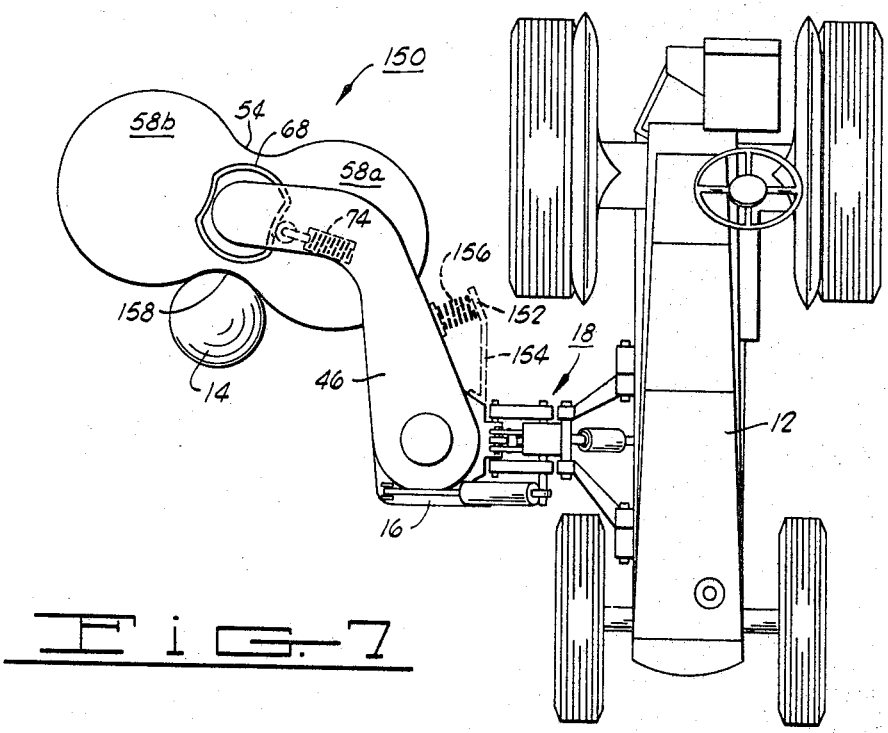
FIG. 7 is a top view of a variation of the FIG. 1 mower device as supported from a tractor.

FIG. 1 illustrates a mowing device 10 supported from a tractor 12 as it approaches a post 14. Referring also to FIG. 3, the mowing device 10 consists of a frame 16 supported by a support assembly 18 which is affixed to the tractor 12.

The support assembly 18 is made up of a support block 20 which is connected by the parallel-arranged movable linkages, upper linkages 22 and a lower pair of linkages 24, to respective pivot studs 26 and 28. Orientation of the parallel disposed linkages 22 and 24 is controlled by a hydraulic cylinder 30 which, in turn, adjusts the vertical level of support block 20. The support block 20 extends a linkage 32 downward into pivotal connection with the mower frame 16 and a hydraulic cylinder 34 and piston rod 36 may be adjusted to control the angle of main frame 16 as it is supported outboard from tractor 12. Still a third adjustment is provided by a hydraulic cylinder 38 and rod 40 pivotally connected between a midpoint 42 of linkage 32 and a pivot stud 44. Adjustment of cylinder 38 controls the angle of linkage 32 and therefore the relative heighth of main frame 16, the three hydraulic adjustments being interdependent.

The frame 16 carries a support arm 46 having one end pivotally mounted thereon by means of a conventional pivot assembly as will be described. A hydraulic motor 48 may be mounted on the support arm 46 to supply mower blade drive power as will be further described below. Thus, in one form, a hydraulic motor 48 is mounted by means of adjustable (belt-tightening) mounting blocks 50 in line with the axis 52 which is also the pivotal axis for connection of support arm 46 to frame 16. The support arm 46 is formed with a characteristic curved shape which provides optimum passive action in cutting operation, and the outer end of support arm 46 carries a cutter head 54 in pivotal affixure about an axis 56. The cutter head 54 is a figure-eight shaped assembly which forms similar cutter housings 58a and 58b, and which is continuously rotatable about axis 56. Cutter housings 58a and 58b cover the juxtaposed mower blades 60a and 60b.

The support arm 46 is continually urged in a direction outboard from tractor 12 by means of a suitable heavy spring such as spring 62. Spring 62 may be secured to frame 16 by a first securing pin 64 and to support arm 46 by a second securing pin 66 as shown in greater detail in FIG. 5. It should be understood that any of the various types of springs, i.e. coil springs, helices, etc. may be employed so long as the spring is selected so that it will urge support arm 46 counterclockwise about axis 52 with the required force. A further spring is employed to maintain cutter head 54 in a desired attitude with respect to axis 56 and support arm 46. Thus, a cam collar 68, shaped as shown in FIG. 1, is secured as by welding about the upper surface of housing 58 and this is made to coact with a spring loaded roller 70 (see FIG. 5) which seeks the ebb portions 72 of cam collar 68 and tends to maintain cutter head 54 at a desired angular disposition. The roller 70 may be pressured by any of the conventional spring devices, such as of a spring-loaded cylinder 74 which is suitably secured to the underside of support arm 46 at a position which ensures proper orientation of cutter head 54.

As shown in greater detail in FIG. 2, the support arm 46 in its normal or inoperative position is held cocked against the tension of spring 62 by means of a cam roller 76 and a locking tab 78 which is suitably welded or otherwise secured to support arm 46. The cam roller 76 is rotatably carried by a sleeve member 80 which may be adjustably positioned along the end of a trip arm 82. As shown also in FIG. 1, trip arm 82 is pivotally connected to the frame 16 by means of a pivot pin 84 and it can readily be seen that rotation of trip arm 82 will tend to release cam wheel 76 from tab 78 to allow the support arm 46 to swing outward under the force of spring 62. The trip arm 82 also carries an additional roller 86 supported on the rear edge to act as a safety precaution which prevents support arm 46 and cutter head 54 from locking about a post during the cutting operation. Thus, a tab 88 is suitably welded or otherwise secured at a selected point on the underside of support arm 46 in such a manner that roller 86 will strike the tab 88 at a certain point in the cutting operation to urge support arm 46 toward a more rearward disposition where binding of the support arm 46 relative to post 14 cannot take place.

Referring more particularly to FIGS. 4 and 5, hydraulic drive power along axis 52 is available on an output pulley 90 which drives a suitable endless belt 92. The endless belt 92 may be selected from any of numerous types which provide the necessary flexibility and tractile strength.

The main drive belt 92 is led out through the support arm 46 and over a pair of idler pulleys 94 and 96, one of which may be made adjustable in conventional manner, to deliver rotational power to a pulley 98 disposed to rotate about the axis 56, the rotational axis of cutter head 54. The pulley 98 then imparts rotational drive along axial shaft 100 to a lower, larger radius drive pulley 102 which transfers the motion to an endless belt 104. The endless belt 104 is then led uni-directionally around oppositely disposed idler pulleys 106 and 108 to respective pulleys 110 and 112 which are affixed to drive each of respective cutter blades 60a and 60b. One or the other of idler pulleys 106 and 108 may be made adjustable in the manner depicted generally as adjustable tension bolt 114. Each of drive pulleys 110 and 112 is secured to a respective axle member 116 and 118 which, in turn, is secured to one of the respective mower blades 60a and 60b. The lower portion of shafts 116 and 118 is terminated as a smooth-surfaced button 120 and 122, these buttons 120 and 122 serving as coaster members for supporting cutter head 54 in its traverse along the ground.

The support arm 46 is rotatably supported on cutter head 54 by means of the ball bearing assembly 124. Ball bearing assembly 124 then contains additional bearing members which serve to transmit the higher rotation drive motion which is present on shaft 100. Thus, drive pulley 98 and shaft 100 are supported by a bushing block 126, a plurality of rollers 128 and a bushing 130 which extend vertically along axis 56 are freely rotatable within ball bearing assembly 124. There are of course many different types of bearing assemblies and combinations which may be utilized for the like function. Similarly, pivotal connection between frame 16 and support arm 46 along axis 52 may take various forms. FIG. 5 depicts a basic pivotal connection utilizing only a ballpivot assembly 132; however, there are many forms of such pivot mechanism which will be suggested to the skilled artisan.

The operation of mower device 10 is depicted in FIGS. 6A through D. As shown in FIG. 6A, the mower device 10 is approaching the post 14, one of a series of sign posts, guard rail posts or whatever. In this attitude the support arm 46 is locked in its trailing position with cam wheel 76 holding locking tab 78 against the tension of spring 62 (see FIGS. 1 and 2). Also, the cam collar 72 roller 70, and spring load 74 (FIG. 1) tend to maintain the cutter head 54 at a predetermined angular disposition with respect to support arm 46.

With continued forward movement of mower device 10, the trip arm 82 contacts post 14 and is moved rearwardly to release cam wheel 76 and locking tab 78 such that the tension of spring 62 forces the support arm 46 in a counterclockwise motion, forward and around the post 14 as shown in FIG. 6B. The support arm 46 is forced into contact with post 14 and it carries cutter housing 58b clear around and on a forward side of post 14, cutter housing 58a trailing therefrom and being urged inwardly behind the post 14. The trip arm 82 remains at a release position, and as the tractor or such motive device moves forward the frame 16 and support arm 46 move forward to pull cutter housings 58a and 58b around the post 14. Thus, the circular cutting action carried out by cutter head 54 is a more-or-less passive reaction to proper movement of frame 16 and support arm 46 past the post 14.

As shown in FIG. 6C, the figure-eight shape of cutter head 54 enables a particularly advantageous cutting motion. As support arm 46 moves past post 14 it places tension on the leading (in this instance) cutter housing 58b which tends to force cutter housing 58a around and forward through the inside of the circular pattern about post 14. Support arm 46 has been forced back such that locking tab 78 will once again engage the cam roller 76 carried by the relaxed trip arm 82. The cam collar 68 is shaped in such a manner that spring tension from springload assembly 74 will cause cutter head 54 to snap around to its opposite disposition, this snap action continuing around post 14 and including a little bit of override which results in further advantageous mowing action. Thereafter, the cutter head 54 is once again in a normal or relaxed position awaiting the next cutting rotation. An arrow 140 shows the approximate motion of the cutter housing 58a as it completes the mowing rotation about post 14.

The completed attitude is shown in FIG. 6D where cutter head 54 has snapped around post 14 to position respective cutter housings 58a and 58b for contact with the next post in the series. The support arm 46 is again urged outward into its normally trailing position wherein roller 76 of trip arm 82 engages locking tab 78 (FIG. 2) to hold the support arm 46 at the proper angle. Also, a spring load assembly 76 coacts with cam collar 68 to hold cutter head 54 at the proper angle. It can also be noted from FIG. 6D that cutter housings 58a and 58b are maintained at a slight angle with respect to the perpendicular to the post row. This is desirable because the respective mower blades 60a and 60b are assembled with no overlap and slight canting of the cutter alignment avoids the leaving of uncut grass. The cutter housings 58a and 58b are each similar in construction such that cutter head 54 can begin its cutting sequence from each of two opposite angular dispositions with respect to the support arm 46. Thus, as shown in FIGS. 6A–D, the cutter housing 58b is thrown forward thereafter to trail around post 14 during the cutting movement, and the next cutting sequence finds cutter head 54 oppositely aligned such that cutter housing 58a will be thrown forward to trail around the next post of the series.

An alternative form of mower device 10 is shown in FIG. 7 which depicts a similar type of mower device 150 which may be employed without a forward trip arm arrangement. Mower device 150 utilizes the similar structure of frame 16 and support assembly 18 carrying a support arm 46 and the rotatable cutter head 54. The cutter head 54 is of the figure-eight type having oppositely disposed cutter housings 58a and 58b, which utilizes the cam collar 68 and spring load assembly 74 for prepositioning and snap action rotation of cutter head 54.

The mower device 150 may rely upon the outboard tensioning of such as the spring 62 (see FIG. 1) or it may utilize a separately placed spring 152, e.g. a support bar 154 suitably secured to frame 16 to maintain a compression spring 156 in engagement with support arm 46. Various other forms of spring device may be employed so long as it provides the necessary function of urging support arm 46 outboard to carry cutter head 54 into engagement with post 14. The similar support assembly 18 may be employed with hydraulic positioning elements as may be controlled from the driver's position of tractor 12.

In operation, tractor 12 can be moved along the fence or post row in such a manner that the post 14 comes into contact with cutter head 54 approximately at its midpoint or identation 158. Forward motion of tractor 12 will then force cutter head 54 about post 14 in a passive manner such that it finally snaps completely around post 14 and returns to an attitude of readiness for contact with the next ensuing post of the row. That is, post 14 bears primarily against cutter housing 58b to force support arm 46 against the tension of spring 156 and to force a rotation of cutter head 54 such that cutter housing 58a continually moves clockwise about post 14. Then, at a certain attitude the spring load assembly 74 and cam collar 68 cause a snap-around action which completes the cut around post 14 and which places cutter head 54 in a next readiness position, this time with cutter housing 58a outboard and cutter housing 58b inboard.

FIGS. 8 and 9 show still another variation of structure with mowing device 10 supported from tractor 12 by means of a linear rack support device 160. The support device 160 as employed to carry a post mower is fully described in U.S. Pat. No. 3,241,302 entitled "Mowing Apparatus" and issued to Robert O. Barry. The support assembly 160 consists of a rail 162 which may be supported lengthwise along the side of tractor 12 by such as hydraulic support cylinders 164 and 166 and respective supporting linkages 165 and 167. The rail 162 includes a gear track 168 extending therealong and a gear (not shown) supported movable member 170 is suitably engaged for movement therealong. A spring loaded retrieving mechanisms 172 is attached to the forward end of the rail 162. The mechanism 172 includes a reel 174 having a length of cable 176 disposed thereon. The free end of the cable 176 is then attached to the movable member 170, and as the mowing device 10 moves rearwardly along the rail 162, the cable 176 will pay out from the reel 174. A spring (not shown) disposed in the retrieving mechanism 172 maintains a continual spring bias to rewind the cable 176. Thus, as the movable member 170 reaches the rearward portion of rail 162 and mowing device 10 clears the particular post being mowed, the movable member 170 is rapidly withdrawn to the forward or start position.

The mower device 10 is adjustable positioned from movable member 170 by means of hydraulic cylinders 178 and 180, each controllable from the driver's position of tractor 12. Thus, the height and level of rail 162 can be controlled by adjustment of hydraulic cylinders 164 and 166 and, thereafter, the angular disposition of mower device 10 is controlled by hydraulic cylinders 178 and 170. A proper coaction of hydraulic cylinders 178 and 180 will allow mower device 10 to be raised completely up into a near-vertical position for high-speed road travel. It is also contemplated that the movement of movable member 170 along rail 162 can also be hydraulicly controlled. That is, a suitable hydraulic metering apparatus of well-known type may be employed to proportion the movement of movable member 170 rearward along the rail 162 in accordance with the forward speed of the tractor 12. Such additional apparatus may enable a very high-speed cutting operation.

ALTERNATIVE EMBODIMENT

FIGS. 10 and 11 disclose a mowing device 190 which may be extended from a tractor 12 by means of the support assembly 18. Thus, the support and positioning control function are the same as previously disclosed with respect to mowing device 10 (FIG. 1). The mowing device 190 consists of a main frame 192 which is adjustably carried by the support assembly 18. An inner support arm 194 is pivotally supported from frame 192 by means of a pivot pin 196 affixed therethrough. An outer support arm 198 is then pivotally connected to the inner support arm 194 about pivotal axis 200, this axis being formed by conventional pivotal bearing means (not shown). The cutting head 200 is centrally, pivotally suspended from the end of outer support arm 198, cutter 202 being the previously described figure-eight shaped assembly consisting of cutter housings 204a and 204b disposed in side-by-side relationship. The cutter head 202 has a cam collar 206 secured thereon and a suitable tension roller 208 and spring-load assembly 210 are supported from the underside of outer support arm 198 to bear against cam collar 206.

A hydraulic motor 212 may be mounted over a pivotal axis 214 at the outer end of outer support arm 198. The hydraulic motor 212 may be a commercially available vane-type of hydraulic motor having the desired low profile which enables passage of the cutter head 202 beneath very low fence or guard rail configurations. Thus, hydraulic power may be supplied through suitable hose connection from the tractor equipment or from auxiliary hydraulic equipment carried thereon. Hydraulic motor 212 then drives directly along pivotal axis 214 to impart rotational drive to each of the respective cutter blades 216a and 216b. Distribution of rotational power from axis 214 outboard to cutter blades 216a and 216b may take place in a manner similar to that for mower device 10 as shown in FIG. 4. The buttons or coaster plates 218a and 218b provide non-interfering ground contact for the mower device 190.

The inner support arm 194 and outer support arm 198 are continually urged toward a normal configuration by means of spring assemblies. A tension spring 220 is suitably affixed between the leading edge of outer support arm 198 and the adjacent edge of inner support arm 194 to continually urge outer support arm 198 in a forward direction. A stop member 222 secured to inner support arm 194 provides a limit. Similarly, inner support arm 194 is continually urged inboard by means of a tension spring 224. Tension spring 224 is suitably affixed between the under side of inner support arm 194 and a suitable brace 226 which is rigidly secured and extending rearward from frame 192. A stop post 228 rigidly affixed to frame 192 and therefore, brace 226 provides a limit for inward traverse of the inner support arm 194.

A trip arm 230 is carried by frame 192 as it extends from pivotal affixture along axis 232. The trip arm 230 is formed to extend a lever arm 234 generally rearwardly and trip arm 230 is biased forward by means of a coil spring 235. An adjustably extendable cam roller 236 is supported by lever arm 234. A cam 238 is effixed to pivot post 196 which is rigidly secured for movement with inner support arm 194. The cam 238 extends into contact with cam roller 236 and it is formed with a characteristic shape which enables a desired operation of inner support arm 194 with respect to the trip arm 230 as will be further described.

While the low profile hydraulic motor 212 is shown in the FIG. 10 embodiment, it should be understood that any of various powering devices may be employed i.e. hydraulic, pneumatic, or electrical, with mountings and power distribution in accordance with accepted design standards offering best advantage. Also, while various pivotal joints and bearings are not specifically shown, the selection and utilization of various types of pivot assembly in accordance with operational requirements is a basic tool of the skilled artisan.

Figures 12A, 12B, 12C, 12D:
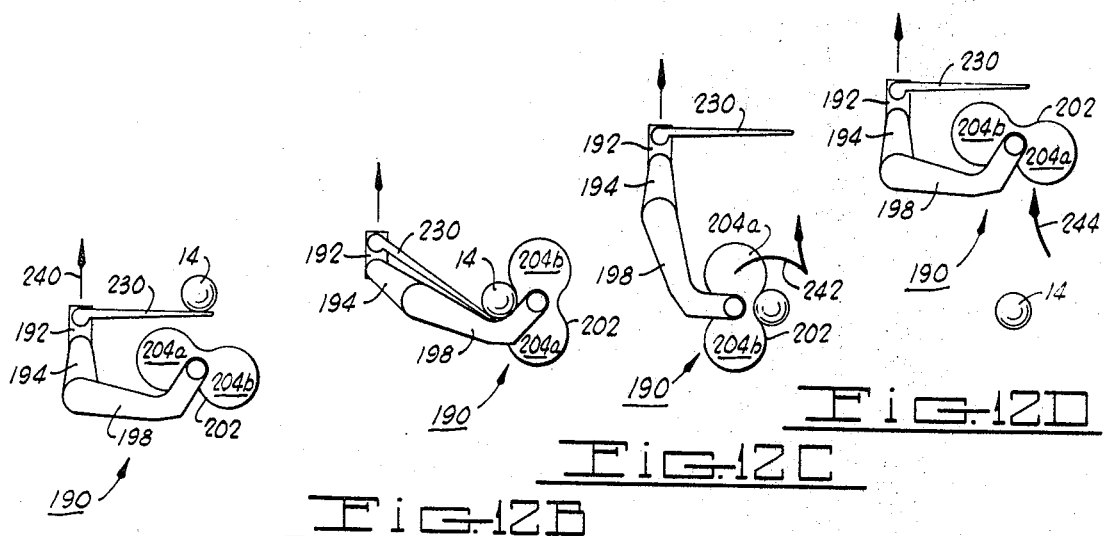
FIGS. 12A, 12B, 12C and 12D depict a series of successive operating attitudes of the mower device of FIGS. 10 and 11.

The operation of mower device 190 is shown in FIGS. 12A through 12D. Movement of the tractor 12 or such support machinery carries the mower device 190 in the direction as indicated by arrow 240. FIG. 12A shows the mower device 190 in its normal or relaxed attitude prior to being tripped by post 14. Forward movement of mower device 190 then brings trip arm 230 into contact with post 14 whereupon it is moved rearward. As can be seen in FIG. 10, rearward movement of trip arm 230 urges cam roller 236 inward against cam 238 and this, in turn, tends to pivot inner support arm 194 outboard against the tension of spring 224.

As the trip arm 230 is moved rearward by a considerable distance as shown in FIG. 12B, the inner support arm 194 will be completely extended and this, in turn, will have forced outer support arm 198 out and around the post 14. During this action, contact of post 14 with cutter housing 204a will have forced cutter housing 204b forward around the outside of post 14. Thereafter, the passive effect of tractor movement will tend to drag cutter head 202 around the post 14 to effect a circular cutter movement.

FIG. 12C shows the manner in which cutter head 202 is dragged around post 14, trip arm 230 having been freed and returned to its forward position under the force of coil spring 235 and the inner support arm 194 having been forced rearwardly inward to its normal position with tension spring 224 holding against stop 228 (FIG. 10). As the mower device 190 progresses still further the cutter head 202 performs a snap-around action to more than complete the cutting circle. This is due to the cam collar 206 and spring-load assembly 210 as previously discussed and it tends to direct the center axis of the leading cutter housing (in this case cutter housing 204a) along the direction of arrow 242. Immediately after the freeing of cutter head 202 and the snap-around action, the outer support arm 198 is drawn upward into its normal position by means of tension spring 220, and cutter head 202 assumes its normal position awaiting the next post contact and cutting. Once again, it can be noted that the orientation as between cutter housings 204a and 204b is opposite for each successive post which it contacts.

The foregoing discloses novel post mowing apparatus which is capable of cutting along fence or post rows at increased speed and efficiency to enable a better mowing result. The device is capable of operation at various, adjustable mowing levels and it can be operated around any of various sizes of posts or poles, even varying sizes in the same cutting series. The mowing device is extremely versatile as to its utilization and several different alternatives are disclosed herein, i.e. it may be mounted to a support or carrying device either stationarily or movably and it may or may not include various integral control mechanisms the choice of these factors lying with the particular type of mowing operation. Further, while the mowing device is disclosed and particularly described as a tractor mounted apparatus, it should be understood that it may just as well be adapted for mounting directly or indirectly on other mowing devices, e.g. as carried by the conventional drawbar type of rotary mower.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. Apparatus for mowing completely around members which are generally vertically disposed in the ground, comprising:
   frame means;
   motive means carrying said frame means past one or more of said members;
   support arm means of generally elongated shape having a characteristic curved shape and being pivotally attached to said frame means at one end and extending the other end proximate to said members;
   cutting means of generally figure-8 shape carrying a pair of spaced rotary blades disposed for cutting rotation in approximately the same plane, said cutting means being pivotally attached to said support arm means other end at a central point between said two spaced rotary blades;
   drive means carried on said support arm means to supply rotational drive to each of said spaced rotary blades;
   tensioning means affixed between said cutting means and said support arm other end to urge said cutting means and its spaced rotary blades to a predetermined angular disposition with respect to said support arm means;
   spring means continuously urging said support arm means outward from said frame means and motive means;
   locking means for holding said support arm means in a predetermined position extending generally rearwardly from said frame means; and
   trip arm means pivotally affixed to said frame means and extending an end in front of said cutting means such that contact with one of said members releases said locking means to allow outward and forward movement of said support arm means to carry one side of said cutting means and one of said pairs of spaced rotary blades into operative position around on the furthest side of said member.

2. Apparatus as set forth in claim 1 wherein said drive means comprises:
   hydraulic motor means disposed at said one end of the support arm means; and transmission means conveying rotational force from said hydraulic motor means to each of said spaced rotary blades of said cutting means.

3. Apparatus as set forth in claim 1 wherein said drive means comprises:
hydraulic motor means mounted on said other end of the support arm means; and
transmission means conveying rotary motion from said hydraulic motor means to said spaced rotary blades of said cutting means.

4. Apparatus as set forth in claim 1 wherein said motive means comprises:
tractor means;
a support assembly secured to said tractor means and being adjustably attached to said frame means to support it outward from said tractor means.

5. Apparatus as set forth in claim 4 wherein said support assembly comprises:
a hinged support linkage;
hydraulic means controlling the position of said hinged support linkage such that said frame means is disposed at a preset angle and level with respect to said tractor.

6. Apparatus as set forth in claim 4 wherein said support assembly comprises:
rack gear means supported horizontally along the side of said tractor;
supporting means adjustably affixed to said frame means; and
gear means rotatably attached to said supporting means for movement along said rack gear means during contact of said cutting means with said members; and
means for returning said supporting means back to the forward end of said rack gear means after said cutting means ceases contact with said members.

7. Apparatus as set forth in claim 2 wherein said transmission means comprises:
pivot pulley means;
first belt means receiving rotational drive from said hydraulic motor means and extending out to transfer said rotational drive to said pivot pulley means;
first and second cutting pulley means each disposed radially outward from said pivot pulley means, each being affixed to drive a respective one of said spaced rotary blades; and
second belt means receiving rotational drive from said pivot pulley means and delivering said drive to each of said cutting pulley means.

8. Apparatus as set forth in claim 3 wherein said transmission means comprises:
drive pulley means receiving rotational output from said hydraulic motor means;
first and second cutting pulley means disposed radially outward from said drive pulley means, each being connected to drive one of said spaced rotary blades; and
belt means conveying said rotary motion from said drive pulley means to each of said cutting pulley means.

9. Apparatus as set forth in claim 1 wherein said support arm means comprises:
first support arm means pivotally attached to said frame means and extending generally rearwadly therefrom; and
second support arm means pivotally attached to the rearward end of said first support arm means.

10. Apparatus as set forth in claim 1 which is further characterized to include:
cam means affixed to said support arm means; and
cam roller means extending from said trip arm means into contact with said cam means such that movement of said trip arm means by said members causes proportional movement of said cam means and said support arm means.

11. Apparatus as set forth in claim 9 which is further characterized to include:
first spring means affixed between said frame means and said inner support arm means to continually urge said inner support arm means inwardly toward said frame means; and
second spring means affixed between said outer support arm means and said inner support arm means to continually urge said outer support arm means in a forward rotational direction relative to said frame means.

References Cited

UNITED STATES PATENTS

| | | | |
|---|---|---|---|
| 2,777,272 | 1/1957 | Smith et al. | 56—25.4 |
| 2,791,081 | 5/1957 | Allen et al. | 56—25.4 |
| 2,838,901 | 6/1958 | Davis | 56—25.4 |
| 2,851,842 | 9/1958 | Harp | 56—25.4 |
| 2,893,194 | 7/1959 | Lamouria | 56—331 |
| 3,045,413 | 7/1962 | Sheffer | 56—25.4 |
| 3,103,090 | 9/1963 | Campbell | 56—6 |
| 3,115,739 | 12/1963 | Thoen et al. | 56—6 |
| 3,241,302 | 3/1966 | Barry | 56—25.4 |
| 3,261,150 | 7/1966 | Fitzgerald | 56—25.4 |

RUSSELL R. KINSEY Primary Examiner